US006892536B2

(12) United States Patent
Lavezzi

(10) Patent No.: US 6,892,536 B2
(45) Date of Patent: May 17, 2005

(54) HYDRAULIC PUMP UNIT FOR VEHICLE

(75) Inventor: Roberto Lavezzi, Bergamo (IT)

(73) Assignee: Freni Brembo S.p.A., Curno-Bergamo (IT)

( * ) Notice: Subject to any disclaimer, the term of this patent is extended or adjusted under 35 U.S.C. 154(b) by 0 days.

(21) Appl. No.: 10/220,867

(22) PCT Filed: Feb. 5, 2001

(86) PCT No.: PCT/EP01/01180

§ 371 (c)(1),
(2), (4) Date: Mar. 3, 2003

(87) PCT Pub. No.: WO01/64491

PCT Pub. Date: Sep. 7, 2001

(65) Prior Publication Data

US 2003/0159440 A1 Aug. 28, 2003

(30) Foreign Application Priority Data

Mar. 3, 2000 (EP) .............................................. 00830165

(51) Int. Cl.[7] ............................ B32B 15/08; B60T 11/30
(52) U.S. Cl. .......................................... 60/584; 60/585
(58) Field of Search ........................ 60/584, 585, 592; 92/79; 188/352

(56) References Cited

U.S. PATENT DOCUMENTS

| 2,524,544 A | * | 10/1950 | Seawell | 60/584 |
| 3,247,670 A | * | 4/1966 | Bauman | 60/585 |
| 3,559,405 A | * | 2/1971 | Nielson | 60/584 |
| 4,971,402 A | | 11/1990 | Chen | |
| 5,040,816 A | * | 8/1991 | Goettker | 60/585 |

FOREIGN PATENT DOCUMENTS

| FR | 2538765 | 7/1984 | |
| FR | 2538765 A | * 7/1984 | B60T/11/26 |

* cited by examiner

Primary Examiner—Thomas E. Lazo
(74) Attorney, Agent, or Firm—Kenyon & Kenyon

(57) ABSTRACT

A hydraulic pump unit (1), for a vehicle, that is unusually capable of precise and effective bleeding, comprises a reservoir (2) for the brake fluid, a master cylinder (3) in the said pump connected to the said reservoir, and a bleed circuit (15) connected at one end to the said master cylinder and fitted with a bleed nipple (19, 119, 219, 319, 419) that is normally closed in order to shut the said circuit off, and it is constructed in such a way that the said bleed circuit (15) is connected at the other end, downstream of the said bleed nipple (19, 119, 219, 319, 419), to the said reservoir (2).

22 Claims, 4 Drawing Sheets

HYDRAULIC PUMP UNIT FOR VEHICLE

The subject of the present invention is a hydraulic pump unit for a vehicle in accordance with the preamble of claim 1. The present invention relates in particular to a pump unit for vehicle brakes and/or clutches.

In order to ensure proper operation of a hydraulic brake circuit, the brake fluid which it contains must be free of bubbles of air or other compressible gases. For this purpose, both the actuators (the calipers and their cylinders) and the pump units for the brake or clutch include a bleed circuit via which any air present in the circuit can be removed.

The expression "brake fluid" denotes a fluid suitable for operating pump units for brakes and/or clutches of vehicles.

It is known from the present applicant's own products that a pump unit can be produced in which the bleed circuit leads from the master cylinder of the pump to the exterior and is fitted with a bleed nipple, onto which the end of a length of tube can be pushed while its other end is submerged in a container to collect the discharged brake fluid.

To bleed the hydraulic brake circuit, the circuit is pressurized by operating the pump and then opening the bleed nipple to draw off a small amount of brake fluid and the air bubbles present within it. The bleed nipple is then re-tightened before the pump control is released.

This known pump unit is not without certain disadvantages.

Firstly, the bleed tubing and the container for collecting the discharged brake fluid have to be connected up to, and then disconnected from, the bleed circuit. Secondly, the tubing and the container have to be made from materials compatible with the brake fluid, which is highly corrosive towards many materials.

Thirdly, there must be adequate working capacity and high cleanliness of the parts that are to be removed in order to ensure that the brake fluid bled off is not dirtied or contaminated due to insufficient prior cleanliness of the tubing and/or container, as the bled brake fluid will then be reused to top up the brake circuit.

Likewise it is important that the brake fluid should not be able to damage the paintwork of the vehicle, against which it is particularly corrosive.

In the fourth place, care must be taken to prevent any other air being drawn in through the screwthread of the bleed nipple, as can happen if the latter is not fully tightened before the pump is released.

Furthermore, for better protection and cleanliness of the bleed nipple, it is necessary to protect it with a rubber cap that must be removed before and repositioned after bleeding. Besides being easily lost, the cap also represents an extra cost.

Last, but not least, is the fact that the projection of the bleed nipple from the pump unit is unsightly and potentially may interfere with other parts of the vehicle.

The technical problem addressed by this invention is that of providing a pump unit, designed particularly but not exclusively for motorcycle applications, that is structurally and functionally such as to overcome all the disadvantages discussed with reference to the prior art cited above.

This problem is solved by the invention with a hydraulic pump unit for a vehicle constructed in accordance with the claims that follow.

The features and advantages of the invention will be made clearer by a detailed description of a number of preferred embodiments thereof described, by way of indication and with no limitation being applied, with reference to the attached drawings in which.

Figure 1:
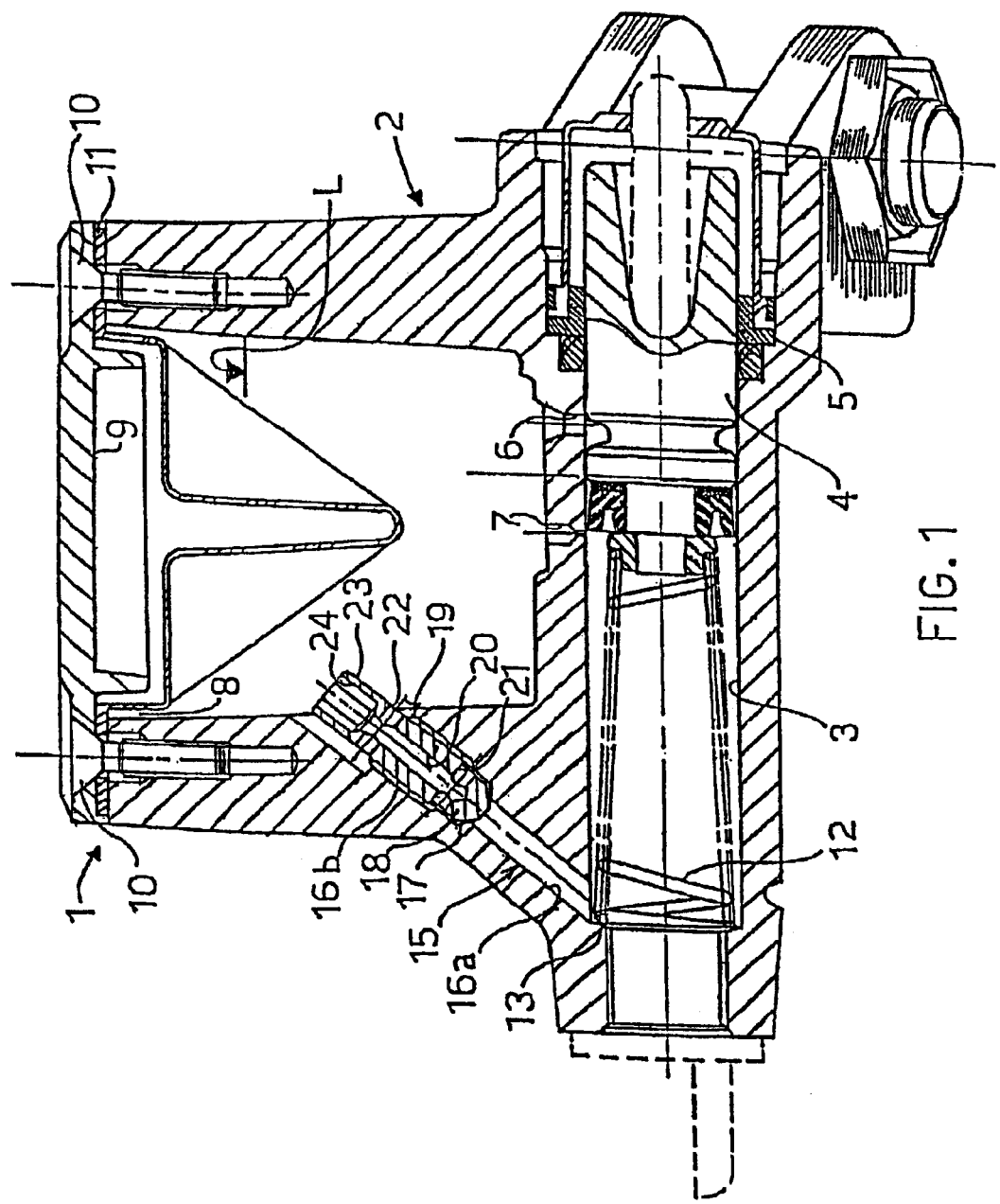
FIG. 1 is an axial section through a pump unit constructed in accordance with a first example of the present invention.
Figure 2:
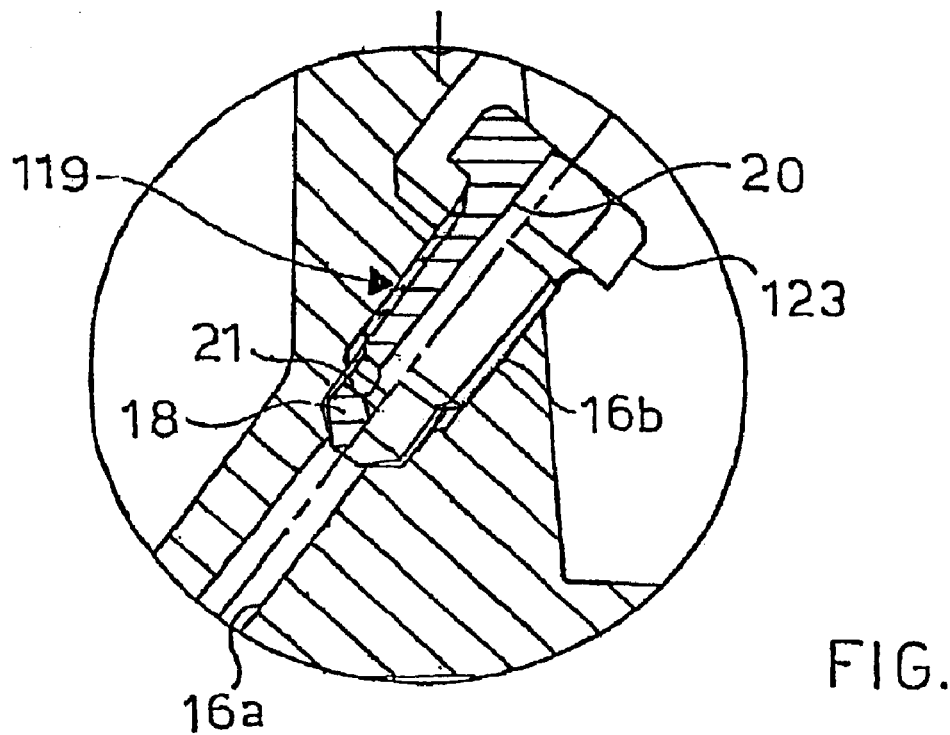
FIGS. 2 and 3 are sectional views on a larger scale of two alternative embodiments of the same detail taken from the unit seen in FIG. 1.
Figure 3:
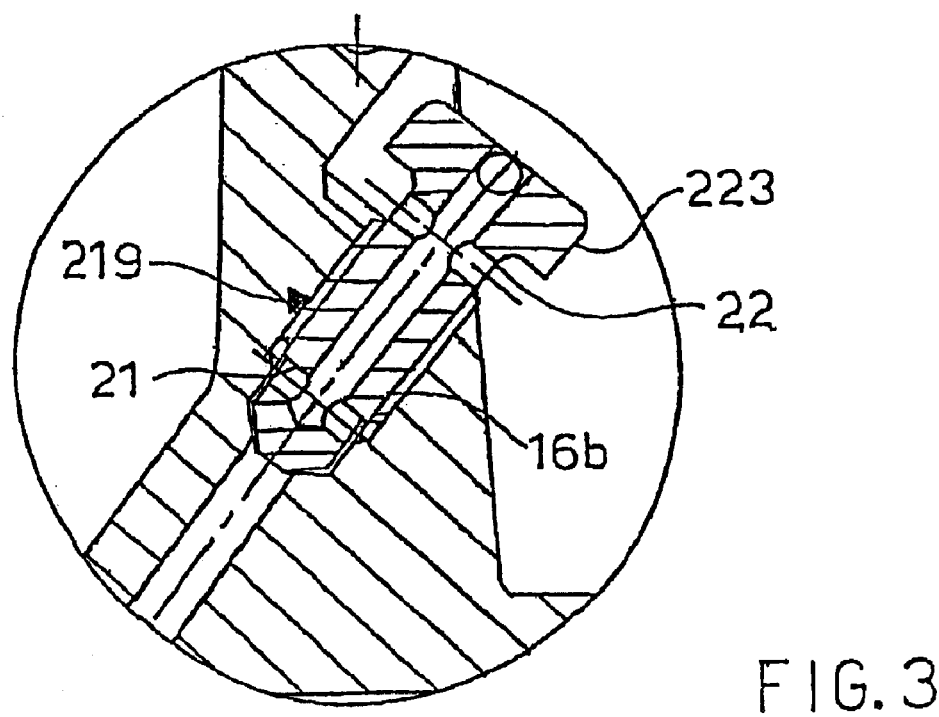

In FIGS. 1 to 3, the number 1 is an overall indication for a hydraulic pump unit for a vehicle, for instance a hydraulic brake pump unit for use on two-wheeled vehicles, motor cycles, snowmobiles and vehicles controlled via handlebars, or such like vehicles.

The unit 1 comprises a reservoir 2 containing the brake fluid and equipped with a pump having a master cylinder 3 in which a floating piston 4, with a seal 5, slides leak tightly in an axial direction. The piston is pushed elastically towards a position of release or relaxation (shown in FIG. 1) by a spring 12 acting between it and a shoulder 13 in the master cylinder 3.

The reservoir 2 communicates with the master cylinder 3 through passages 6, 7 and is closed at its mouth 8 by a cover 9 that is fastened removably with screws 10. A gasket 11 is provided between the mouth 8 of the reservoir and the cover 9.

A bleed circuit with the general indication 15 runs between the master cylinder 3 and the reservoir 2.

The bleed circuit comprises a first length 16a which is cylindrical, has an approximately constant diameter, opens into the master cylinder in the vicinity of the shoulder 13 and ends in the opposite direction in a seating 17 for a frustoconical shutoff member 18 produced on an axial end of a bleed nipple 19. The nipple 19 can be screwed in and out in a threaded second length 16b of the bleed circuit 15, contains an axial cavity 20 that divides up into first and second radial passages 21, 22, and has a head 23 containing a hexagonal sunken indentation 24 for turning by means of a key.

In the variants illustrated in FIGS. 2 and 3, the bleed nipples shown here and indicated by the references 119 and 219, respectively, employ the same reference numerals as in the example of FIG. 1 for analogous details. Both differ from the nipple shown in FIG. 1 in having a head 123, 223 for a hexagonal spanner.

In the nipple 119, the axial cavity 20 opens directly into the reservoir, whereas in the nipple 219 it is closed off and discharge into the reservoir is via the radial passage 22.

It will be observed, however, that the bleed circuit 15 opens into the reservoir 2 at a substantially lower level than the normal operating level (L) of the brake fluid contained in the reservoir so that the outlet of the circuit 15 is always submerged, during bleeding operations, in the aforementioned brake fluid.

It will also be observed that in the solutions envisaged the bleed nipple is accessible through the reservoir, and that the outlet of the circuit into the reservoir preferably does not point directly towards the mouth (or cover) in order to avoid brake fluid being ejected out of the reservoir during bleeding operations.

Lastly, it will be observed that in the embodiment shown by way of example in FIG. 1 the presence of a wrench in the hexagonal sunken indentation 24 in the head 23 will temporarily close the axial cavity 20 at the reservoir end without the need for special arrangements for closing it off, as for example illustrated in FIG. 3.

Figure 4:
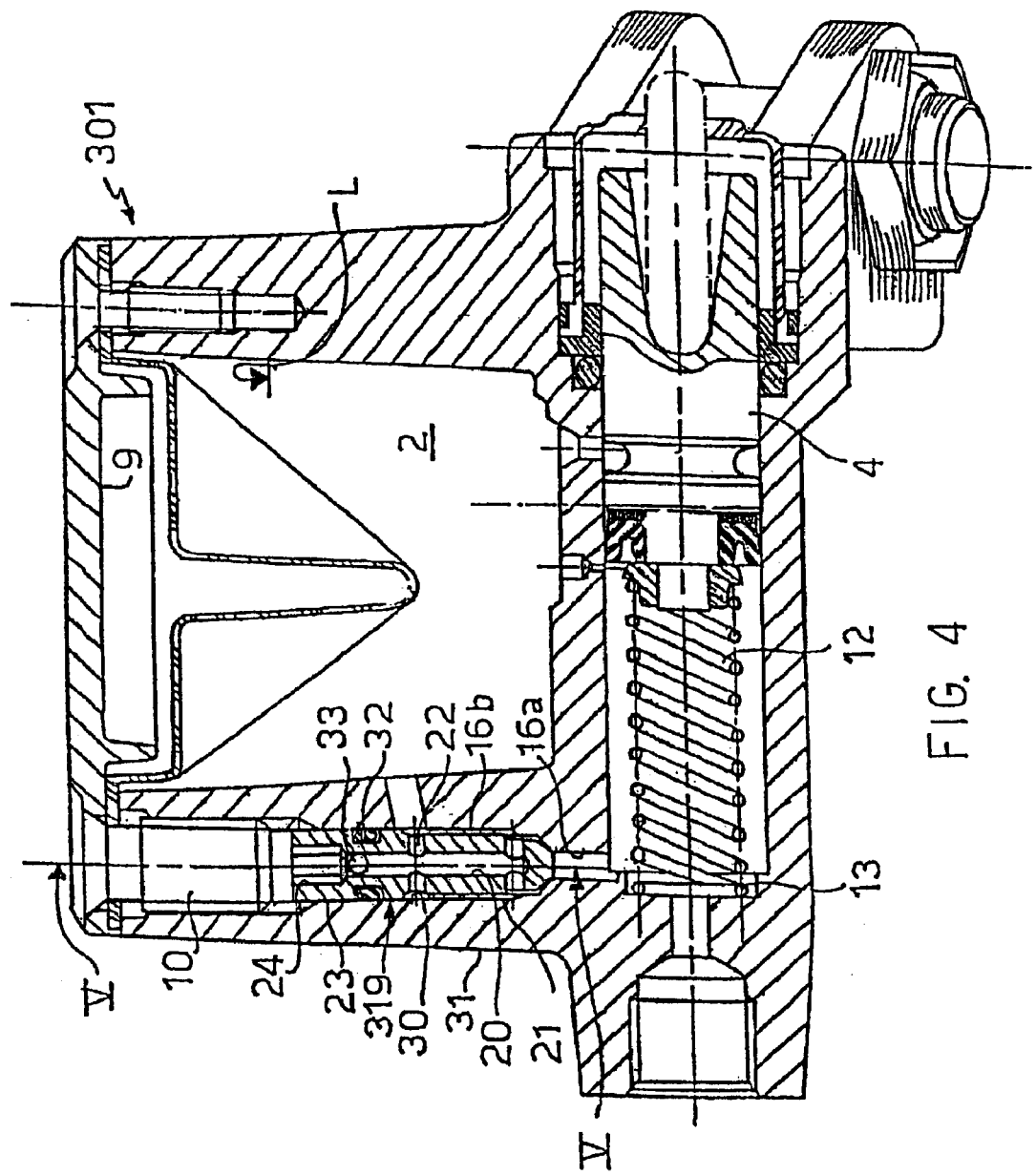
FIG. 4 is an axial section through a pump unit constructed in accordance with a second example of the present invention.
Figure 5:
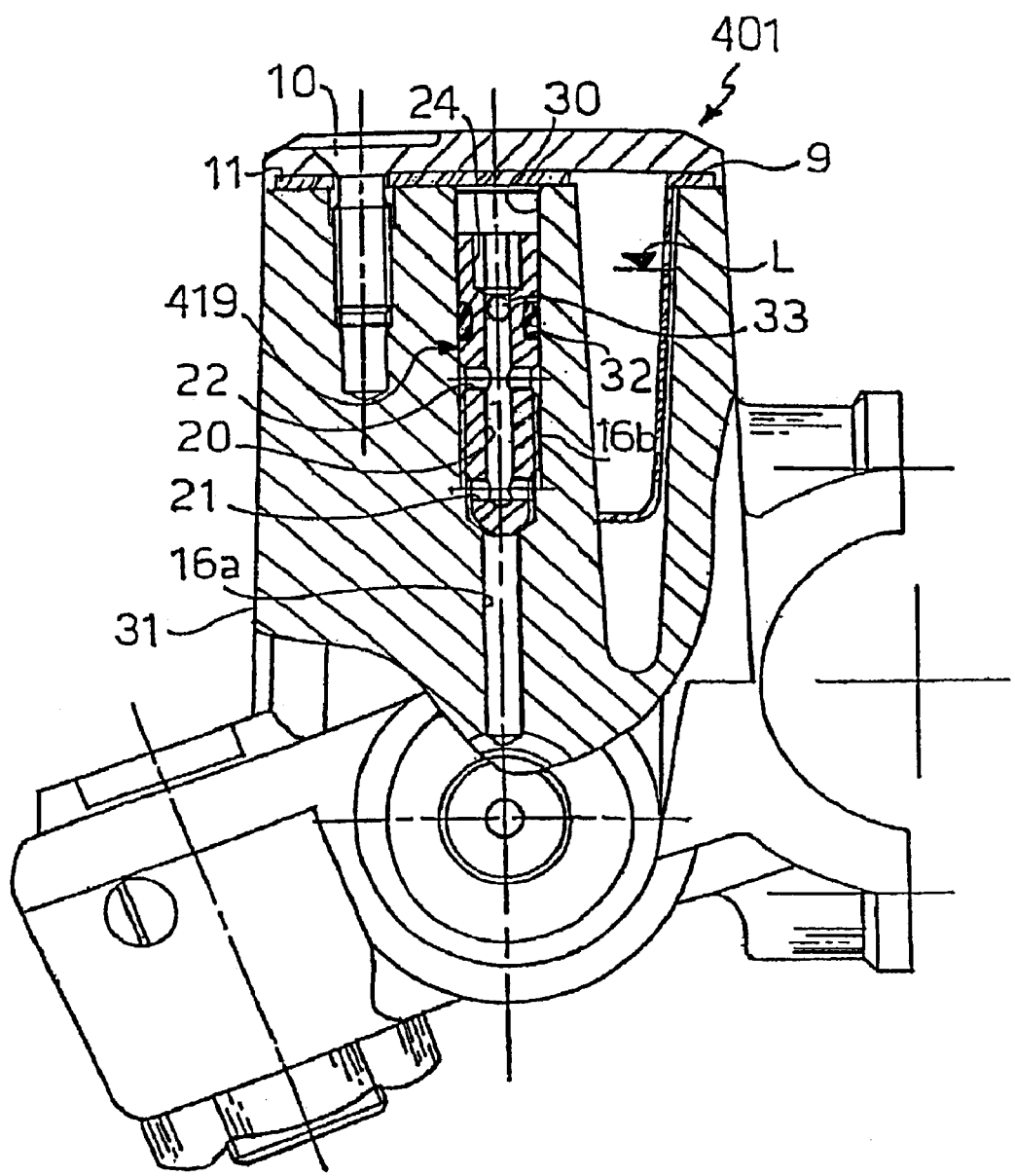
FIG. 5 is a transverse section taken on V—V as marked in FIG. 4 through the pump unit in an alternative embodiment.

FIGS. 4 and 5 illustrate a second example of an embodiment of the invention in two variants indicated by the respective general references 301 and 401. Details analogous to those of the earlier figures are indicated by the same reference numerals.

The bleed nipple 319, 419 in both variants of this example is not accessible through the reservoir 2 but through a hole 30 formed in the thickness of one of the walls 31 of the reservoir 2 and parallel to this wall. In the first variant 301 the hole 30 coincides with the hole for one of the screws 10 used to secure the cover 9 and the bleed nipple 319 is accessible following removal of this screw but without the cover 9 having to be removed. In the second variant 401 the hole 30 is formed with an axis parallel to and spaced apart from the fixing screws 10 and is closed removably by the cover 9. In the latter case access to the bleed nipple requires that the cover 9 be taken off first.

In the solutions envisaged in FIGS. 3, 4 and 5, the bleed nipple 223, 319, 419 is structurally similar to that of the example of FIG. 1, from which it differs however in that the axial cavity 20 is closed by a ball 33 forced into the end of the hexagonal sunken indentation 24, thus ensuring that the fluid escapes through the first and second radial passages or diametrical holes.

In the variants of FIGS. 4 and 5 the bleed nipple 319, 419 is also differentiated by the fact that an O-ring 32 is provided between it and the hole 30 to prevent leakage out of the reservoir 2 along the bleed nipple. This serves to further prevent the risk of contamination of the brake fluid present in the reservoir.

In all cases air bleeding operations are carried out as follows.

Having actuated the pump to pressurize the brake circuit, the bleed nipple is slackened off so that some of the brake fluid escapes through the bleed circuit into the reservoir, carrying any air bubbles with it in the process. Even if the cover 9 of the reservoir has been removed, as it must be in all the examples illustrated with the exception of that of FIG. 4, no brake fluid will be ejected out of the reservoir because the small pressurized jet of fluid at the outlet of the bleed channel is not directed towards the mouth 8.

The invention thus achieves numerous advantages over solutions offered in the prior art, including the following:

- it makes it unnecessary to connect the bleed nipple to a length of tubing and to the external container,
- it reduces, if not eliminates, the risk of contamination of the brake fluid during bleeding operations,
- it eliminates the risk of spillage of brake fluid in the environment during bleeding operations, thus reducing the risk of damage to the bodywork of the vehicle,
- the locating of the bleed nipple under the fluid level in the reservoir eliminates the risk of air re-entering the brake circuit should the bleed nipple be insufficiently tightened and allows a visual check of the escape, i.e. the bleeding, of the expelled air bubbles,
- the bleed nipple is protected and cannot be lost, takes up no space, creates no unsightly protrusions and necessitates no additional protection.

In order to fulfill any particular needs that may arise, a person skilled in the art will be able to make numerous modifications, adaptations and substitutions of components with others of equivalent function, to the preferred embodiment of the pump unit described above, without however departing from the scope of the following claims.

What is claimed is:

1. An hydraulic pump unit for a vehicle, wherein an hydraulic pump uses an hydraulic fluid, comprising:
   a reservoir for the hydraulic fluid;
   a master cylinder in the hydraulic pump, wherein the master cylinder is connected to the reservoir; and
   a bleed circuit, wherein the bleed circuit is connected at one end to the master cylinder and at the other end to the reservoir, and wherein the bleed circuit includes a bleed nipple, wherein the bleed nipple is fitted in the bleed circuit and wherein the bleed nipple is closed during normal operation of the hydraulic pump unit to shut off the bleed circuit, and wherein the bleed nipple is accessible through the reservoir, whereby the bleed nipple may be opened for bleeding hydraulic fluid from the master cylinder to the reservoir.

2. The hydraulic pump unit, according to claim 1, wherein the bleed circuit opens into the reservoir at a substantially lower level than the normal operating level of the hydraulic fluid in the reservoir.

3. The hydraulic pump unit, according to claim 2, wherein the reservoir includes a mouth that is removably closed by a cover, and the bleed circuit further comprises an outlet into the reservoir, wherein the outlet does not point directly towards the mouth.

4. The hydraulic pump unit, according to claim 3, wherein the bleed nipple comprises a shank portion, the shank portion defining an axial cavity, and the outlet of the bleed circuit leads radially through the bleed nipple from the axial cavity.

5. The hydraulic pump unit, according to claim 4, wherein the bleed nipple further comprises a head, wherein the head includes an indentation for insertion of a key, whereby the key may be used to open and close the bleed nipple.

6. The hydraulic pump unit, according to claim 5, wherein the indentation for a key is a sunken hexagon.

7. A vehicle brake system comprising the hydraulic pump unit of claim 1.

8. A vehicle friction clutch system comprising the hydraulic pump unit of claim 1.

9. The hydraulic pump unit, according to claim 1, wherein the reservoir includes a mouth that is removably closed by a cover, and the bleed circuit further comprises an outlet into the reservoir, wherein the outlet does not point directly towards the mouth.

10. The hydraulic pump unit, according to claim 9, wherein the bleed nipple comprises a shank portion, the shank portion defining an axial cavity, and the outlet of the bleed circuit leads radially through the bleed nipple from the axial cavity.

11. The hydraulic pump unit, according to claim 10, wherein the bleed nipple further comprises a head, wherein the head includes an indentation for insertion of a key, whereby the key may be used to open and close the bleed nipple.

12. The hydraulic pump unit, according to claim 11, wherein the indentation for a key is a sunken hexagon.

13. An hydraulic pump unit for a vehicle, wherein an hydraulic pump uses an hydraulic fluid, comprising:
   a reservoir for the hydraulic fluid;
   a master cylinder in the hydraulic pump, wherein the master cylinder is connected to the reservoir; and
   a bleed circuit, wherein the bleed circuit is connected at one end to the master cylinder and at the other end to the reservoir, and wherein the bleed circuit includes a bleed nipple, wherein the bleed nipple is fitted in the bleed circuit and wherein the bleed nipple is closed during normal operation of the hydraulic pump unit to shut off the bleed circuit, and wherein the bleed nipple is accessible through a hole formed in one wall of the reservoir, wherein the hole is parallel to the one wall of the reservoir.

14. The hydraulic pump unit, according to claim 13, wherein the reservoir comprises:

a mouth; and a cover, wherein the mouth is removably closed by the cover using a plurality of screws, and wherein the hole is closed removably by one of the plurality of screws.

15. The hydraulic pump unit, according to claim 14, wherein the bleed nipple comprises a shank portion, the shank portion defining an axial cavity, and the outlet of the bleed circuit leads radially through the bleed nipple from the axial cavity.

16. The hydraulic pump unit, according to claim 15, wherein the bleed nipple further comprises a head, wherein the head includes an indentation for insertion of a key, whereby the key may be used to open and close the bleed nipple.

17. The hydraulic pump unit, according to claim 16, wherein the indentation for a key is a sunken hexagon.

18. A vehicle brake system comprising the hydraulic pump unit of claim 13.

19. A vehicle friction clutch system comprising the hydraulic pump unit of claim 13.

20. The hydraulic pump unit, according to claim 13, wherein the bleed nipple comprises a shank portion, the shank portion defining an axial cavity, and the outlet of the bleed circuit leads radially through the bleed nipple from the axial cavity.

21. The hydraulic pump unit, according to claim 20, wherein the bleed nipple further comprises a head, wherein the head includes an indentation for insertion of a key, whereby the key may be used to open and close the bleed nipple.

22. The hydraulic pump unit, according to claim 21, wherein the indentation for a key is a sunken hexagon.

* * * * *